(12) United States Patent
Ostrovsky et al.

(10) Patent No.: US 7,683,755 B2
(45) Date of Patent: Mar. 23, 2010

(54) CONTROL SYSTEM FOR ELECTRICAL DEVICES

(75) Inventors: Michael Ostrovsky, Brooklyn, NY (US); Damon Bruccoleri, Long Branch, NJ (US)

(73) Assignee: Leviton Manufacturing Corporation, Inc., Melville, NY (US)

( * ) Notice: Subject to any disclaimer, the term of this patent is extended or adjusted under 35 U.S.C. 154(b) by 0 days.

(21) Appl. No.: 11/149,365

(22) Filed: Jun. 10, 2005

(65) Prior Publication Data
US 2006/0125649 A1 Jun. 15, 2006

Related U.S. Application Data

(60) Provisional application No. 60/623,841, filed on Oct. 29, 2004, provisional application No. 60/584,085, filed on Jun. 29, 2004.

(51) Int. Cl.
G05B 23/02 (2006.01)
G05B 11/01 (2006.01)
G08B 5/36 (2006.01)
H05B 37/02 (2006.01)
H05B 41/38 (2006.01)

(52) U.S. Cl. ............... 340/3.9; 340/310.14; 340/310.16; 340/825.22; 315/295

(58) Field of Classification Search .................. 340/3.9, 340/310.14, 825.22, 310.11, 310.12; 315/295, 315/291, 294
See application file for complete search history.

(56) References Cited

U.S. PATENT DOCUMENTS

| 4,399,513 | A | | 8/1983 | Sullivan et al. |
| 4,644,484 | A | | 2/1987 | Flynn et al. |
| 4,649,323 | A | | 3/1987 | Pearlman et al. |
| 4,695,739 | A | | 9/1987 | Pierce |
| 4,779,071 | A | * | 10/1988 | Guglielmo ............. 340/310.11 |
| 4,990,908 | A | * | 2/1991 | Tung ..................... 340/825.63 |
| 5,036,214 | A | * | 7/1991 | Zerillo ....................... 307/140 |
| 5,189,412 | A | * | 2/1993 | Mehta et al. ........... 340/310.11 |

(Continued)

FOREIGN PATENT DOCUMENTS

DE 3143446 5/1983

(Continued)

OTHER PUBLICATIONS

Touchpoint Brochure (copyright 1999).

(Continued)

*Primary Examiner*—Edwin C Holloway, III
(74) *Attorney, Agent, or Firm*—Weiss & Arons, LLP

(57) ABSTRACT

Systems and techniques for a lighting control system which include a control switch to control an electrical device are disclosed herein. The control switch includes a master display to display status information of the electrical device. Additionally, a remote control switch couples to provide user-initiated commands to the control switch for controlling the electrical device. The remote control switch includes a display and receive signals from the control switch to display the same status information of the electrical device which enables a user in a location separate from the electrical device to accurately control the electrical device. A second embodiment of the control system may include a unidirectional switch which generates additional control signals that are transmitted to the control switch for control of the electrical device.

46 Claims, 8 Drawing Sheets

U.S. PATENT DOCUMENTS

| | | | |
|---|---|---|---|
| 5,207,317 | A | 5/1993 | Bryde et al. |
| 5,248,919 | A | 9/1993 | Hanna et al. |
| 5,283,516 | A * | 2/1994 | Lohoff ................ 323/322 |
| 5,336,979 | A * | 8/1994 | Watson et al. ............ 315/362 |
| D353,798 | S | 12/1994 | Bryde et al. |
| 5,399,940 | A | 3/1995 | Hanna et al. |
| 5,537,104 | A * | 7/1996 | Van Dort et al. ........... 340/3.71 |
| 5,581,261 | A * | 12/1996 | Hickman et al. ....... 340/825.49 |
| 5,637,930 | A | 6/1997 | Rowen et al. |
| 5,753,983 | A | 5/1998 | Dickie et al. |
| 5,848,054 | A * | 12/1998 | Mosebrook et al. .......... 340/3.7 |
| 5,895,985 | A * | 4/1999 | Fischer ................ 307/116 |
| 5,905,442 | A | 5/1999 | Mosebrook et al. |
| 5,909,087 | A | 6/1999 | Bryde et al. |
| 5,986,358 | A * | 11/1999 | Hsieh ................ 307/117 |
| 6,005,308 | A | 12/1999 | Bryde et al. |
| 6,169,377 | B1 | 1/2001 | Bryde et al. |
| 6,174,073 | B1 * | 1/2001 | Regan et al. ........... 340/825.69 |
| 6,229,433 | B1 * | 5/2001 | Rye et al. ............... 340/3.54 |
| 6,297,746 | B1 * | 10/2001 | Nakazawa et al. ..... 340/825.69 |
| 6,313,588 | B1 | 11/2001 | Mosebrook et al. |
| 6,346,781 | B1 | 2/2002 | Mosebrook et al. |
| 6,587,739 | B1 * | 7/2003 | Abrams et al. ......... 340/310.11 |
| 6,933,686 | B1 | 8/2005 | Bishel |
| 7,106,168 | B2 | 9/2006 | McMahon |
| 7,190,125 | B2 | 3/2007 | McDonough et al. |
| 2002/0135476 | A1 | 9/2002 | McKinney, Jr. et al. |
| 2004/0206616 | A1 | 10/2004 | Leopold et al. |
| 2006/0012315 | A1 * | 1/2006 | McDonough et al. ....... 315/291 |

FOREIGN PATENT DOCUMENTS

DE          29618435          2/1998

OTHER PUBLICATIONS

Touchpoint Decora Installation Instructoins (dated Feb. 10, 2000).

* cited by examiner

CONTROL SYSTEM FOR ELECTRICAL DEVICES

This application claims the benefit of the filing date of a provisional application having Ser. No. 60/584,085, which was filed on Jun. 29, 2004 and a provisional application having Ser. No. 60/623,841, which was filed on Oct. 29, 2004.

BACKGROUND OF THE INVENTION

The present invention relates to a device and/or system used to control electrical devices.

Electrical devices, such as, an electrical appliance, light source, or electric fan, may be controlled by multi-pole power switches including three-way and four-way switches. These switches may be used to turn ON and OFF the electrical device. Moreover, these switches are operable to turn ON and OFF these electrical devices from more than one location. Toggling any one of the switches can cause the electrical device to change states. That is, to change from ON to OFF or vice versa.

In some applications, however, it may be desirable to dim the light or change the rate of fan revolutions of the electrical fan rather than simply toggling the state of the electrical device from ON to OFF. Therein, a control device such as a dimmer may be used to affect the state of the light or fan. Moreover, wireless remote control of these electrical devices, further including televisions, hi-fi equipment, and air-conditioners may be used to turn ON, turn OFF, to dim or adjust other variable settings of these devices. Specifically, a master control switch may be configured to control, through the use of a dimmer, one or more light sources within a room such that each light has variable illumination. In addition, a remote control switch may control these same light sources by varying the intensity of each source. There are scenarios, however, wherein the position of the controlled load (i.e. a light or fan) is not visible from the position where a user seeks to control the load. In particular, the user may be adjusting a dimmer of a light from a first room in a house while the user is located in a second room. Since the user is unable to see the effect of the dimmer on the intensity of the light, this approach will not enable the user to properly control the brightness of the light.

Therefore, a need exists for a control switching system having a control panel that provides a user with status information of the electrical device connected thereto.

BRIEF SUMMARY OF THE INVENTION

To address the above-discussed deficiencies of switching control systems for electrical loads or devices, the present invention teaches a control system that includes a control switch to control an electrical device. The control switch may include a master display that displays status information of the electrical device. At least one remote control switch, having a remote display, is in communication with the control switch. The remote control switch can provide signals to the control switch for control of the electrical device and receive signals from the control switch for display of the status information of the electrical device on the remote display.

In another embodiment, the system can include a unidirectional switch in communication with the control switch. The unidirectional switch can provide signals to the control switch for control of the electrical device.

The control switch and the at least one remote control switch may further include user-accessible actuators that can be used to generate command information to allow the control switch to control the electrical device and to generate status information for the electrical device. The status information can be displayed at the same time or at different times by the master display and the remote display. Regardless of whether the command information was generated by the control switch or the remote control switch, the corresponding status information generated by the control switch is displayed by both the master display and the remote display.

The system has the advantage of enabling a user of the system to be informed of the status of the electrical device by monitoring either the master display or the remote display. In this way, the user has the ability to control the status of the electrical device even if the device is not visible to the user from the control switch or the remote control switch.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 8 is a flow diagram of an implementation of an operation of a control switch when the electrical device is ON.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth the herein. Rather, these embodiments are provided so that this invention will be thorough and complete, and will fully convey the scope of the invention to those skilled in the art.

Figure 1:
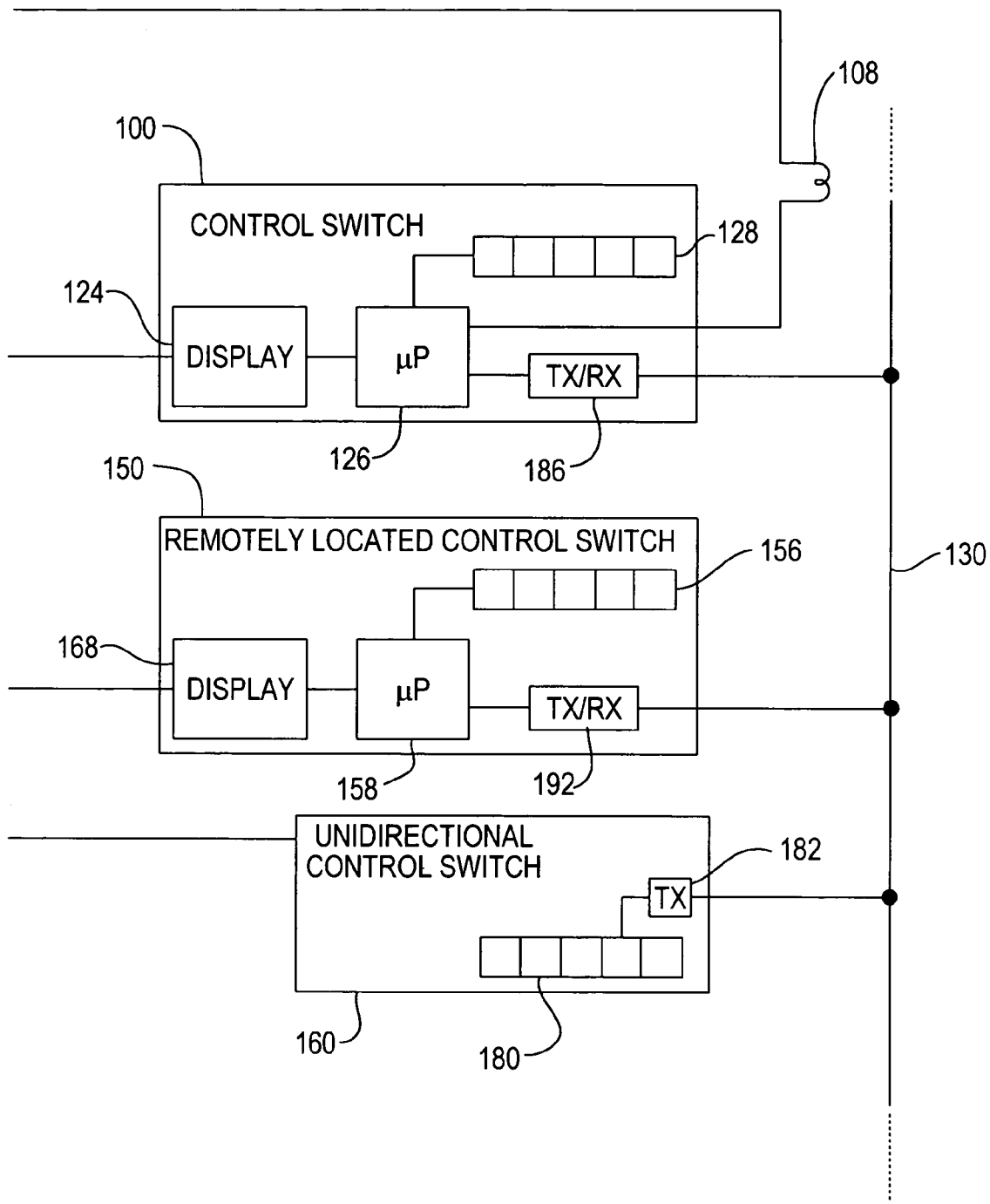
FIG. 1 is a block diagram of the control system in accordance with the present invention.

FIG. 1 illustrates an implementation of a lighting control system in accordance with the present invention. The present invention comprises a control switch 100 coupled to at least one remote control switch 150 where the control switch or any one of the at least one remotely connected control switches 150 is able to activate or otherwise control an electrical device 108. Each switch, 100 and 150, may include a display, 124 and 168, to provide information describing a status of the device 108. Display, 124 and 168, may comprise an arrangement of light emitting diodes as will be discussed in one embodiment of the control switch according to the present invention. In the alternative, display, 124 and 168, may include, and are not limited to, a liquid crystal display or a plasma display. Status information relating to the state of the electrical device may include, but is not limited to, audible signals and visual graphics and may be any type of information that describes the state of the electrical device or information which can be used/processed to determine the state of the electrical device. Specifically, the remote display and master display may display whether the device is ON and OFF. In addition, when the electrical device is a lamp or some other light source, the remote display and the master display may display the corresponding level of illumination of the light source. More particularly, remote display 168 enables a user to view the present state of the electrical device without being present at the location of the electrical device. Simultaneously, the same information may be displayed on the master display 124. The switches, 100 and 150, are able to bi-directionally communicate with each other (i.e., transmit and/or receive information) to control and/or activate the electrical device and display the same electrical device status information. The control switch 100 may be electrically coupled to the at least one remote control switch 150 and constitute a control system that further has at least one unidirectional control switch 160 coupled to the control switch and to the at least one remote control switch. The at least one unidirectional control switch 160, which also can be remotely located from the control switch 100, is able to transmit information to the control switch 100 and the remote control switch where such information is used to control and/or activate the electrical device. The control switch 100 can receive information from either the remote control switch 150 or the unidirectional control switch 160 and use that information to activate or otherwise control the electrical device 108, display information about the status of the electrical device and cause the remote control switch to display the same or similar electrical device status information. The control switch 100, remote control switch 150 and the unidirectional switch 160 may be coupled by a travel wire 130 through which communication between the switches may be effected. In the alternative, switches 100, 150, 160 may be coupled wirelessly or by alternative means. Thus, switches, 100, 150, and 160, are able to communicate with each other over some communication medium.

Further, in FIG. 1, the control switch 100 can include a microprocessor 126 coupled to the display panel 124, a transmitter and receiver circuit 186 and user accessible actuators 128. The remote control switch 150 also may include a microprocessor 158 coupled to the display panel 168, a transmitter and receiver circuit 192 and user accessible actuators 156. Microprocessors, 126 and 158, may include, and are not limited to, a complex instruction set computer processor and a reduced instruction set computer processor. A user of the control switch 100 is able to engage one or more of the actuators 128 which the microprocessor 126 may interpret as a command (or a set of commands) to perform one or more actions for controlling the electrical device 108. The actions can be performed by the control switch 100 and the resulting status of the electrical device being controlled may be conveyed to the user by the control switch display panel 124. The control switch also can transmit electrical device status information on travel wire 130 to the remote control switch 150 to allow that switch also to display the same status information on display panel 168; control switch 100 or more specifically microprocessor 126 is able to communicate with displays 124 and 168. Similarly, the user can engage one or more of the actuators 156 of the remote control switch which the microprocessor 158 of that switch interprets as a command (or a set of commands) to perform one or more actions for controlling the electrical device 108. The remote control switch 150 can transmit the command information on travel wire 130 to the control switch 100 which can receive the command information and interpret said information. It should be recognized that command information may be information generated by either the control switch 100, the remote control switch 150 or the unidirectional control switch 160 as a result of a user engaging one or more of the user accessible actuators (128, 156 or 180) of either of the three types of switches, 100, 150, or 160, or as a result of either of the switches, 100, 150, or 160, receiving a command over a communication medium. In response to the received command information, the control switch 100 can then control the electrical device 108 and display the resulting status of the electrical device on the display panel 124. The control switch 100 can then transmit the electrical device status information to the remote control switch 150 which, in turn, can display the same status information on display panel 168. The status information is transmitted with the use of a status signal which can be an analog or digital signal or a combination of both types of signals.

The unidirectional control switch 160 can include user accessible actuators 180 and transmit circuitry 182. A user can engage the actuators 180 of the unidirectional control switch 160 to cause transmit circuitry 182 of the unidirectional control switch to transmit the commands to the control switch 100 and to the remote control switch 150. The control switch 100 can perform the actions dictated by the commands and then display panel 124 the status of the electrical device 108 and transmit the electrical device status information to the remote control switch 150 which, in turn, also may cause display panel 168 to display the same status information.

Set of commands used by switches, 100 and 150, may be different in format than commands used by switch 160. However, switches, 100 and/or 150, are designed to communicate with each other and with switch 160.

Figure 2:
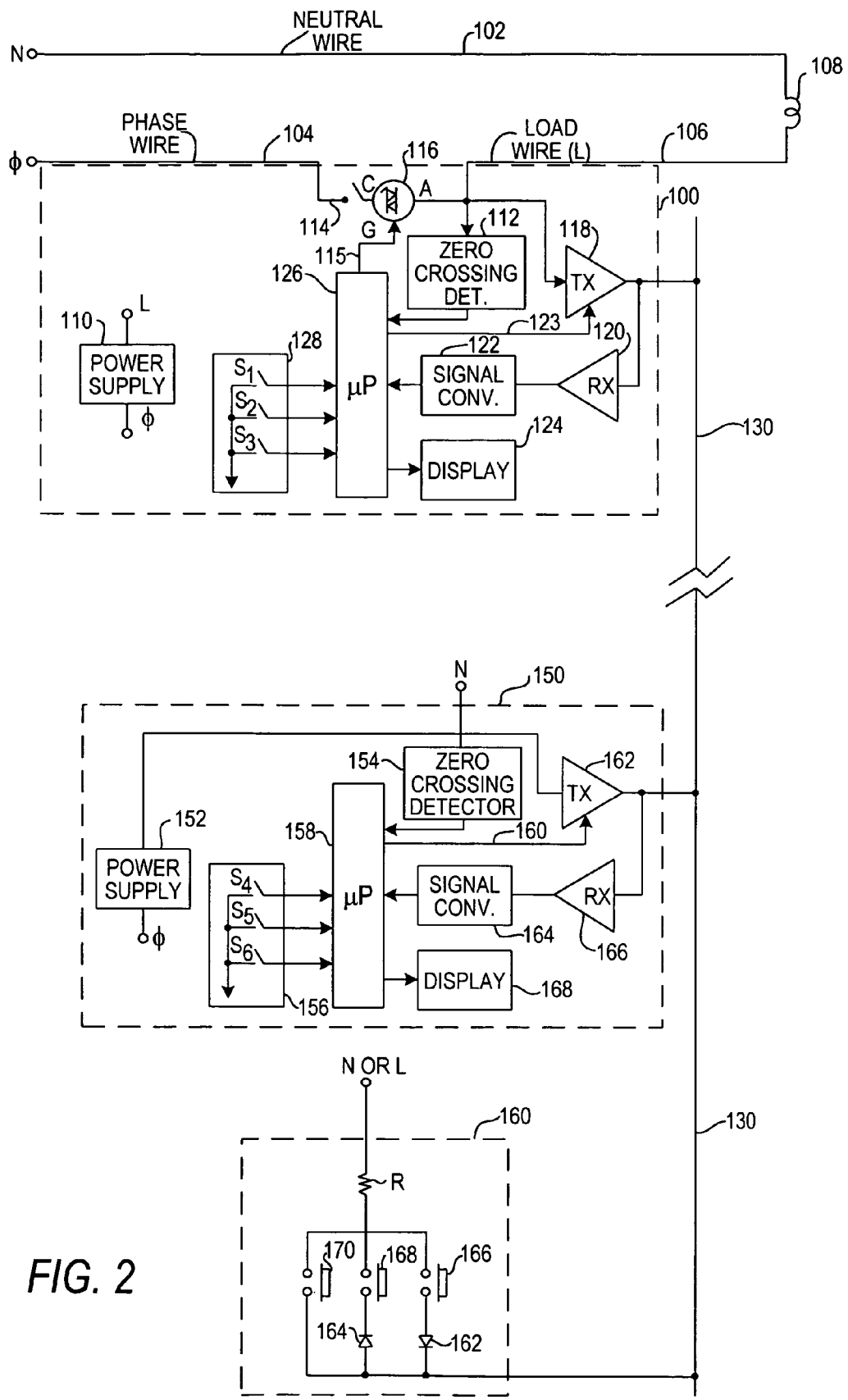
FIG. 2 illustrates a partial circuit diagram for an implementation of the block diagram of the control system of FIG. 1.

FIG. 2 illustrates circuitry for the lighting control system of FIG. 1 and includes control switch 100, remote control switch 150 and unidirectional control switch 160, all of which are coupled to travel wire 130 through which information from any of the switches may be conveyed (i.e., transmitted and/or received). The lighting control system may include one or more remote control switches. The lighting control system may also include one or more one unidirectional control switches. For ease of explanation, control switch 100 will hereinafter be referred to as "the dimmer," remote control switch 150 will hereinafter be referred to as "the remote" and unidirectional switch 160 will hereinafter be referred to as "the simple switch." Thus, dimmer switch 100 is directly controlling electrical device 108 shown in FIG. 1 as a light fixture having a lighting element such as bulb. The electrical device 108 can be any type of device that may be controlled by a switch. For example electrical device 108 can be a fan, a household appliance or other electrical device. For ease of explanation electrical device 108 will be referred to as light 108.

Dimmer 100 can control, for example, the amount of current flowing through light 108 by proper activation of a triac 116. Triac 116 is a bidirectional three terminal semiconductor device that allows bidirectional current flow when an electrical signal of proper amplitude is applied to its "G" (or gate) terminal. Triac 116 also has a "C" (or cathode terminal) and an "A" or anode terminal. When an electrical signal is applied to the gate G, triac 116 is said to be gated. When properly gated, current (or other electrical signal) can flow from the "C" terminal to the "A" terminal or from the "A" terminal to the "C" terminal. When triac is not gated or is not properly gated, relatively very little or substantially no current (or no signal) can flow between the "A" and "C" terminals. In summary, triac 116 acts as an electrically controlled switch which can allow some or no current flow based on the amplitude of the electrical signal being applied to its "G" terminal. Connected in series to triac 116 is mechanical switch 114. Mechanical switch 114 can be an "air gap switch" that can be activated to stop current flow through phase wire 104, load wire 106, light 108 and neutral wire 102. Electrical energy from a source (not shown) provides current that flows from phase terminal (Ø) through wire 104, mechanical switch 114, triac 116, load wire 106, light 108, neutral wire 102 and back to the electrical energy source through neutral terminal N. The amount of current flowing through the phase and neutral wires will determine the intensity of the light. Triac 116 can be gated to provide current amounts related to intensities of light 108 or can be gated to provide substantially no current thus essentially switching off light 108.

Electrical energy can be provided to light 108 by the phase (Ø) and neutral (N) terminals. With mechanical switch 114 closed, the electrical energy can be controlled by triac 116 to switch on light 108, increase or decrease the intensity of light 108 or switch off light 108. When mechanical switch 114 is open, no current flows through light 108. Opening up mechanical switch 114 is referred to as a "hard switch off" which allows a user to change or replace a lamp in light 108 without risk of an electrical shock.

Dimmer 100 includes a microprocessor 126 which can be coupled to zero cross detector circuit 112, display circuit 124, signal conversion and receiver circuits 122, 120 and user interface circuit 128. Microprocessor 126 can control the operation of triac 116 and transmitter 118. Microprocessor 126 can be a well known off the shelf processor semiconductor integrated circuit (i.e., microprocessor "chip") or a control circuit designed to perform certain actions depending on the status of various of its inputs or a combination of a microprocessor and a control circuit. The electrical energy flowing through light 108 can be a 120/220 volt AC (alternating current), 60/50 Hz signal. The AC signal (current and/or voltage) may be a sinusoidal signal symmetrically alternating about a zero volt reference point. The AC signal flowing through phase wire 104, air gap switch 114, triac 116 and load wire 106 is applied to the input of zero crossing detector 112 and transmitter 118. Zero crossing detection circuit 112 detects the zero crossings of the line signal which occur every half cycle. Microprocessor 126 uses the output of zero crossing detector 112 for various timing functions such as the proper timing of signals it generates to control triac 116 and transmitter 118. Dimmer 100 has a power supply circuit 110 coupled to the phase and load wires. Power supply 110 uses well known circuits that are used to convert an AC signal to a direct current (DC) (or voltage) that may be used to power electronic circuits.

In addition to light 108, the AC signal also may be applied to the input of transmitter 118 which operation is controlled using the timing from zero crossing detector 112; that is positive half cycles of the 60 Hz AC signal can be generated when the microprocessor 126 turns on transmitter 118 only during the occurrence of the positive cycles. Similarly, negative half cycles can be generated when the microprocessor 126 turns on transmitter 118 during occurrences of the negative cycles. The microprocessor 126 can control transmitter circuit 118 by turning on triac 116 or some other type of AC switch allowing control signals to be generated at positive or negative half cycles depending on the transmitting code. The output of transmitter 118 can be applied to travel wire 130. Travel wire 130 can be one of the standard color coded wires used in household switches and other household electrical devices; for example travel wire 130 can be the yellow wire which is one of the color coded wires complying with a standard electrical wiring color code convention. The travel wire also can be colored yellow with a red stripe. In the same convention, the phase wire 104 can be black, the load wire 106 can be red and the neutral wire 102 can be white.

Microprocessor 126 can control transmitter 118 through control line 123; that is the signal that switches ON and switches OFF transmitter 118 at a certain rate is applied to control line 123. Similarly, microprocessor 126 controls triac 116 through control line 115. The microprocessor can control the amount of current flowing through light 108 by applying a certain signal to the gate of triac 116 through control line 115. For example, microprocessor 126 can cause bursts of the AC signal to go through triac 116 by switching ON and switching OFF triac 116 at a desired rate. The switch ON time period may be equal to, less than or more than the switch OFF time period. The amount of current flowing through light 108 will depend on the duty cycle (ratio of switch ON time period to switch OFF time period) of the microprocessor generated signal applied to the gate of triac 116 and, thus, the intensity of light 108 also will depend on this signal. Display circuit 124 is a circuit that indicates the relative intensity of the brightness of light 108. In an implementation, display circuit 124 includes a row of LEDs (Light Emitting Diodes) and can be arranged to show the relative brightness and/or intensity of light 108. The display circuit 124 also includes a status LED indicating whether the electrical device (e.g., light 108) is energized. The status LED is also called the ON/OFF indicator. In an implementation, display circuit 124 includes five (5) or seven (7) LEDs arranged in a horizontal or vertical row to indicate intensity level and also includes an ON status LED located separately from the five other LEDs. The status LED indicates whether light 108 is ON or OFF. Thus, depending on the amount of current microprocessor 126 is causing to flow through light 108, it will energize the proper amount of LEDs to indicate the relative intensity of light 108.

Receiver circuit 120 has an input coupled to travel wire 130 and its output coupled to signal conversion circuit 122 whose output is coupled to microprocessor 126. Receiver circuit 120 can sense AC signals (presence or absence of half cycles) decoded by the microprocessor and convert the signals to a digital signal to microprocessor 126. For example, the received signals may be about 120 VAC when at a logic "high" while the microprocessor 126 is designed to interpret a 5 volt signal as a logic "high" and 0 volt or −5 volts as a logic "low." Thus, microprocessor 126 interprets received signals from either remote 150 or unidirectional switch 160 or both and transmits signals to the remote 150.

A user can operate dimmer 100 to control light 108 by engaging user accessible actuators 128 which are depicted as three switches S1, S2 and S3. The actuators can be any mechanical, electromechanical, electro-optical device that is controllable by a user. For example the actuators can be a rotating wheel mechanisms that allow a user to control the intensity of light 108 or turn ON or OFF light 108. The actuators may enable a user to control predetermined aspects of the light 108. For example, switch S1 may be an ON/OFF switch for the light, switch S2 may be an intensity switch to increase the intensity of light 108; and, switch S3 can be an intensity switch used to decrease the intensity of light 108. The switches can be "micro switches" that may be mounted on a printed circuit board disposed within a circuit housing of the dimmer.

During normal operation, air gap switch 114 is closed allowing current flow to light 108 when triac 116 is switched on by microprocessor 126. When a user engages switch S1 to either switch ON or OFF light 108, microprocessor 126 detects this action by the user and interprets the user's command and, in response, turns ON or OFF light 108. Processor 126 can switch light 108 ON or OFF by providing an appropriate signal to the gate of triac G through control line 115. Similarly, when a user engages either switch S2 or switch S3 to either increase or decrease the intensity of light 108, the microprocessor applies a signal to the gate of triac 116 via control line 115 to achieve the desired intensity. Microprocessor 126 also can activate a number of LEDs in the display circuit to indicate the current intensity of light 108. When light 108 is switched OFF, the status LED is switched ON to notify the user that the light 108 is OFF and also to allow the user to locate the dimmer that may be now in a darkened room. When light 108 is ON, the status LED is OFF. Therefore, dimmer 100 is able to indicate the status of the electrical device (e.g., light 108) through the use of the display circuit 124 having LEDs and a separate ON/OFF indicator LED. For example, for a fan, the LEDs may be indicia of the speed at which the fan is currently rotating. Dimmer 100 transmits status information relating to the status of the electrical device over travel wire 130 to remote control switch 150. The remote control switch 150 can receive the status information using receiver (RX) 166, signal conversion circuit 164. Processor 158 can be used to interpret the received status information. Microprocessor 158 can activate display panel 168 to display the same status information as dimmer 100. Display circuit 168 of remote 150 can be substantially the same as display 124 of dimmer 100.

Light 108 can be switched ON or OFF and its intensity can be controlled not only by dimmer switch 100, but by simple switch 160 or remote control switch 150. Other than a triac such as triac 116 and an air gap switch such as air gap switch 114, remote control switch 150 may be designed substantially the same as dimmer 100. Remote control switch 150 does not have an air gap switch or a triac because it does not directly control the operation of light 108; it does so by interpreting commands from a user engaging user accessible actuator 156. Microprocessor 158 interprets the user's commands and transmits the command information over travel wire 130 via transmitter 162. Remote control switch 150 has zero crossing detector circuit 154 which may be used for timing, or synchronization purposes with dimmer 100. For example, zero crossing detector 154 can be used for the transmission of half wave (positive and negative) or rectified AC signals. Remote control switch 150 can be powered by AC signals from neutral line 102. Remote control switch 150 may include a power supply 152 powered from the neutral and phase lines as shown. A user can indirectly control the operation of light 108 by engaging user accessible actuator 156 to perform a command. Actuator 156 contains switches S4, S5 and S6 used to switch light 108 ON or OFF, increase intensity of light 108 and decrease intensity of light 108 respectively. The command is interpreted by microprocessor 158 which transmits the command over travel wire 130 using transmitter 162. Microprocessor 158 controls transmitter 162 through control line 160. The transmitted command is received by dimmer 100 which interprets it and controls light 108 as per the received commands. Dimmer 100 then displays the status of light 108 and sends the status information over travel wire 130 which is received by remote control switch 150 which interprets the information and also displays the same information. Dimmer 100 and remote 150 can be manufactured to have substantially the same physical appearance. Thus, dimmer 100 and remote 150 are able to display the same information in the same manner regardless of whether the commands originated from dimmer 100 or remote 150.

For simple switch 160, a user can engage any of the three switches 170, 168 or 166 to cause an AC signal, negative half waves or positive half waves respectively to be transmitted over travel wire 130. Resistor R can limit the current being applied to simple switch 160. Unidirectional control switch 160 can obtain the AC signal from either the neutral or load wires. Both remote 150 and dimmer 100 will receive the signals from simple switch 160, interpret the commands being represented by such signals and dimmer 100 will perform the user-requested actions. Dimmer 100 can display the status of light 108 and transmit the status information to remote 150, which, in turn can display the same status information.

The signals representing various commands that are exchanged between the various control switches of the present invention can be positive and negative half waves created from a rectification of the AC signal (120 volts, 60 Hz). For example, a command can be any combination of M positive half waves and K negative half waves transmitted over L half cycle periods where K and M are integers $\geq 0$, L is an integer $\geq 1$ and where K+M$\leq$L. The positioning of each of the M positive and K negative half waves relative to each other will depend on the particular code being followed by the system of the present invention. Any combination of K+M positive and negative half waves over L half cycle periods can be used. Note that for a 60 Hz signal, the half cycle period is 8.33 milliseconds; that is, L is a period which is equal to half the cycle of a 60 Hz signal. The above coding schemes for commands is but one example of how the AC signal or other signals can be used to create a set of commands; however, the system of the present invention is not limited to the above coding scheme. Also, simple switch 130 may be designed to transmit commands using the same coding scheme as remote 150 and dimmer 100 or a different coding scheme. If simple switch 130 is using a different coding scheme for the commands, remote 150 and dimmer 100 can be programmed to recognize this coding scheme in addition to the first coding scheme used between them.

In both dimmer 100 and remote 150, the ON/OFF switches (S1 and S4) and the intensity control switches (S2, S3, S5 and S6) may be operated by a user to implement specific commands. The dimmer 100 and the remote 150 may operate in substantially the same fashion. To avoid repetition and in the interest of clarity of explanation, only the operation of the dimmer 100 will now be discussed.

Light 108 is OFF

When the light 108 is OFF and a user desires to switch it ON, the user can actuate the ON/OFF switch S1 once (a single tap) causing one switch closure which is detected by microprocessor 126 which engages triac 116 to switch ON light 108 or to switch ON light 108 at a particular fade rate and the light intensity will reach a predefined preset level. The single tap is one tap followed by a pause of at least one second. The fade rate is a measure of how quickly (or how many times) the light intensity changes from one intensity to another during a defined time period. The fade rate can be a programmed fade rate. The preset level is either a level programmed into the dimmer by the user while the dimmer was in programming mode, described below, or is a level selected by the user using the intensity switches prior to light 108 being switched ON. It should be noted that the one switch closure caused by the user is interpreted as such by the microprocessor 126 only when there is at least a one second pause following the switch closure. During the pause no switch closures are performed by the user. Multiple taps (in rapid succession of less than one (1) second between each tap) to the ON/OFF switch will not cause anything to occur. The device of the present invention does not respond to multiple taps. The dimmer has a dim-lock feature which can be turned on or off. The dim-lock feature is the ability for the dimmer to have the light 108 go to the same preset level whenever the light 108 is switched ON. That is, when the dim-lock feature is ON, the dimmer causes the light 108 intensity (or brightness) to rise to a preset level when the light is switched ON. The setting of the dim-lock feature, that is, setting the dimmer light at a certain preset level is discussed below. While the dim-lock feature is ON, a user can temporarily override it by manipulating the intensity switches to temporarily select a new intensity level while light 108 is OFF; then when the light is switched ON, it will go to the new level either instantly or at a programmed fade rate. However, if the light is switched OFF and then switched ON again, it will revert back to the programmed preset level due to the dim-lock feature. The dim-lock feature can be turned OFF if, while programming the preset level (see below), the user selects an intensity preset level that is so low that the light will effectively be turned OFF if set at that level. When the dim-lock feature is OFF, the user can select the preset level by manipulating the intensity switches while the light is OFF and then when the light is switched ON, it will go to that preset level.

The user also can press and hold switch S1 for a period of time (for example, three seconds or more), microprocessor 126 will switch ON light 108 by proper gating of triac 116 causing light 108 to turn ON at a first fixed fade rate that cannot be changed by the user; this first fixed fade rate (e.g., 10 sec.) is set by the manufacturer of the dimmer 100 and the user is not able to modify it. Furthermore, when switch S1 is pressed and held, light 108 will go to a fixed level different from the preset level programmed by the user. The fixed level cannot be changed by the user, it is set by the manufacturer of the dimmer. It should be noted that when either of the intensity switches or the ON/OFF switch is actuated while the light 108 is fading up from an OFF state will cause the light 108 to return to the OFF state.

Light 108 is ON

When the light 108 is ON and a user desires to switch it OFF, the user can actuate the ON/OFF switch S1 once (a single tap) causing one switch closure (to be followed by at least 1 second of no switch closures) which is detected by microprocessor 126 which engages triac 116 appropriately to switch OFF light 108 or to switch OFF light 108 at a particular fade rate. The fade rate is programmed into the dimmer by the user while the dimmer is in programming mode, described below.

The user also can press and hold switch S1 for a period of time (for example, one second or more), microprocessor 126 will switch OFF light 108 by proper gating of triac 116. The light 108 is switched OFF (without fading) after a delay (defined by the manufacturer) where such delay has no relationship with the length of time switch S1 was held. The delay is a fixed delay and after such delay has elapsed, light 108 is abruptly switched off; there is no fade. When the dim-lock feature is OFF as explained above and the user decreases the intensity of light 108 to a new level through the manipulation of the intensity switches, the new level will become the new preset level. This new preset level can be changed if (1) the user once again changes the intensity level while the light is on; (2) switches off the light and changes the intensity level while the light is OFF or (3) enters into the programming mode and turns on the dim-lock feature to establish a preset level different from the new level. It should again be noted that while the light is fading due to the user operating either the intensity switches or the ON/OFF switch the user can stop the fading by pressing once either the ON/OFF switch or any of the intensity switches; the light 108 will revert to the intensity immediately prior to the start of fading.

In the operation of the intensity switches while light 108 is ON, each actuation of the intensity switches by the user is interpreted as a command to either increase or decrease intensity depending on which intensity switch was operated. Microprocessor 126 is programmed to increase or decrease the intensity of light 108 by a predefined amount after an intensity switch actuation. There are no fade rates associated with one actuation to "increase intensity" or one actuation to "decrease intensity" command. That is, actuation of either of the intensity switches will not cause light 108 to fade. Light 108 will instantly brighten or dim to the next intensity level. The microprocessor 126 will cause the intensity of light 108 to increase or decrease in intensity after having recognized the one actuation of either S2 or S3. Thus, a user can increase intensity (or decrease intensity) with the use of a series of single actuations of S2 (or S3). The programming of the fade rates is discussed below. The one actuation of either of the intensity switches is a switch closure followed by at least a one second pause. Multiple switch closures with pauses of less than one second between closures are not recognized by the dimmer. Thus, multiple switch closures in relatively rapid succession will not cause any operation to be performed by the dimmer 100.

Remote 150 operates in the same manner as dimmer 100 except that remote 150 does not control light 108 directly as explained above. Therefore, whenever intensity switches S5 and S6 are operated or ON/OFF switch S4 is operated by a user, the commands are interpreted by microprocessor 158 which transmits the commands to dimmer 100 through travel wire 130 using a protocol or coding scheme being followed by the one or more remotes and dimmer. Dimmer 100 receives the command information from remote 150 and microprocessor 126 executes the commands as explained above.

Figure 3:
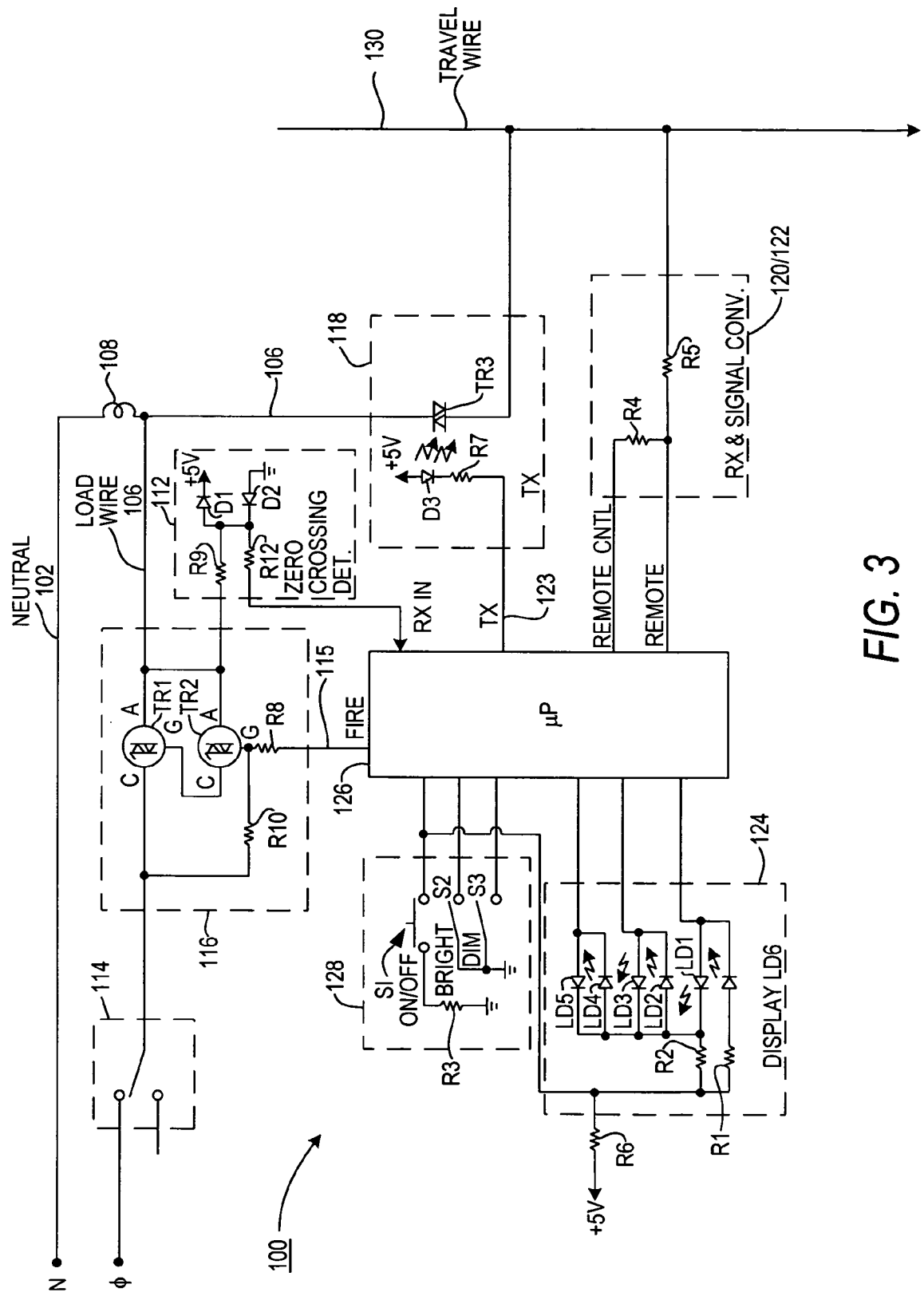
FIG. 3 is a more detailed circuit diagram of an implementation of a control switch illustrated in of FIG. 2.

FIG. 3 illustrates the dimmer 100 of FIG. 2 with an implementation of the various circuits coupled to microprocessor 126. Triac 116 can be implemented with two triacs TR1 and TR2. Triac TR1 is controlled by microprocessor 126 which applies a "FIRE" signal onto control line 115 to turn on triac TR2 which in turn gates triac TR1 allowing an AC signal to pass through light 108 and back to the power source via neutral wire 102 assuming air gap switch 114 is closed as shown. Zero crossing detector 112 is implemented with diodes D1, D2 and resistors R9 and R12. The AC signal on the load wire 106 is applied to resistor R9 which acts as a current limiting resistor. Diodes D1 and D2 serve to limit the AC signal to a relatively small voltage that can be handled by microprocessor 126. At each zero crossing of the AC signal diodes D1 limits an ensuing positive half cycle to +5 volts or an ensuing negative half cycle to approximately zero volt. The resulting signal thus switches from zero volt to 5 volts or from 5 volts to zero volt at each zero crossing of the AC signal.

User accessible actuators 128 are shown as switches with ON/OFF switch S1 using a pull-down resistor R3. Display circuit 124 comprises several LEDs with current limiting resistors R6, R1 and R2. Transmitter circuit 118 can be a triac (TR3) that is controlled by microprocessor 126 through an opto-coupler circuit consisting of diode D7 and resistor R7. Microprocessor 126 activates diode D3 which energizes the gate of triac TR3 optically allowing at least a portion of an AC signal to pass from load wire 106 onto travel wire 130. Receiver 120 and signal conversion circuit 122 are able to receive an AC signal from travel wire 130 and convert the signal to a level that can be handled and processed by microprocessor 126. Microprocessor 126 can apply a 5 volt signal at the REMOTE_CNTL pin input and the signal appearing on the travel wire will be properly interpreted at the input labeled REMOTE.

Figure 4:
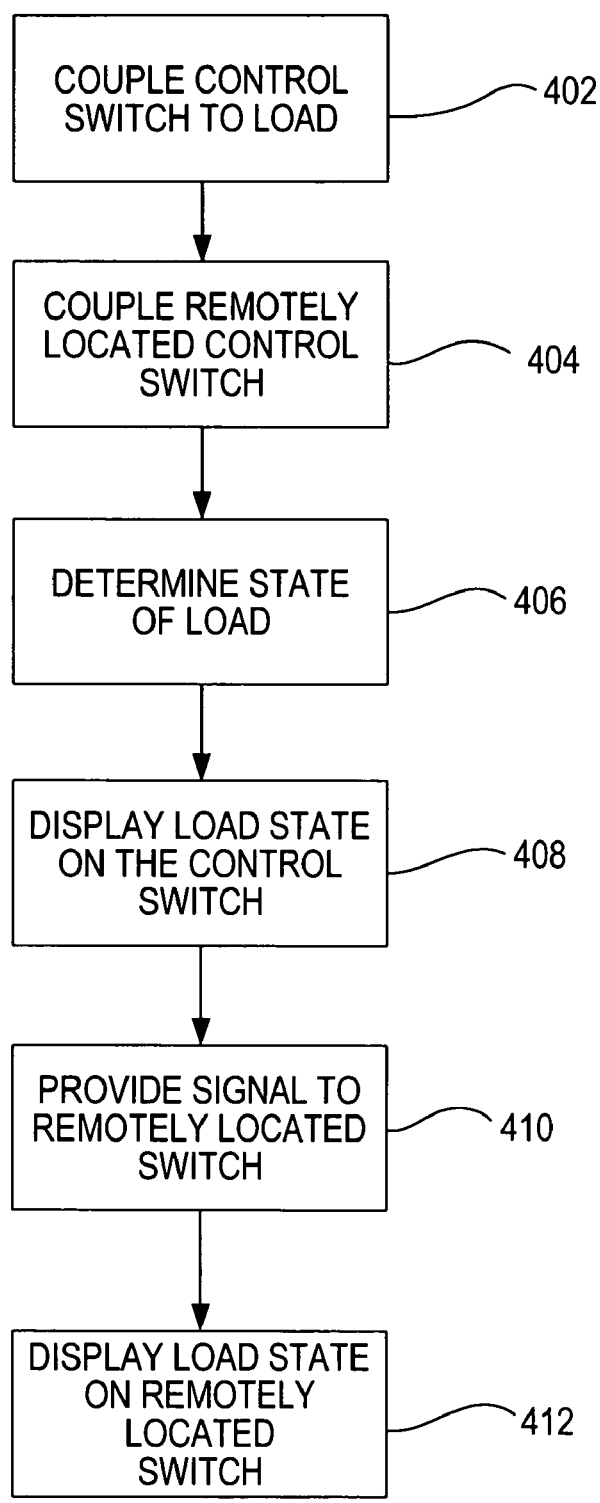
FIG. 4 is a flow diagram of a method for a control system in accordance with the present invention.

FIG. 4 illustrates a flow diagram 400 of a method for controlling an electrical device such as a lamp. In a first step 402, a control switch is coupled to the electrical device. The control switch also may be coupled to a remote control switch in another step 404. The control switch is directly coupled to the electrical device and is capable of controlling the electrical device. The remote control switch can control the electrical device through operation of the control switch. In step 406, the control switch determines a state of the electrical device. For example, if the electrical device is a lamp, a state of the lamp could be "ON." The control switch displays an indication of the state of the lamp, for example, by illuminating selected light-emitting diodes in step 408. The control switch can provide a signal indicative of the state of the electrical device to the remote control switch in another step 410, and that switch also can display the state of the device as shown in step 412.

Figure 5:
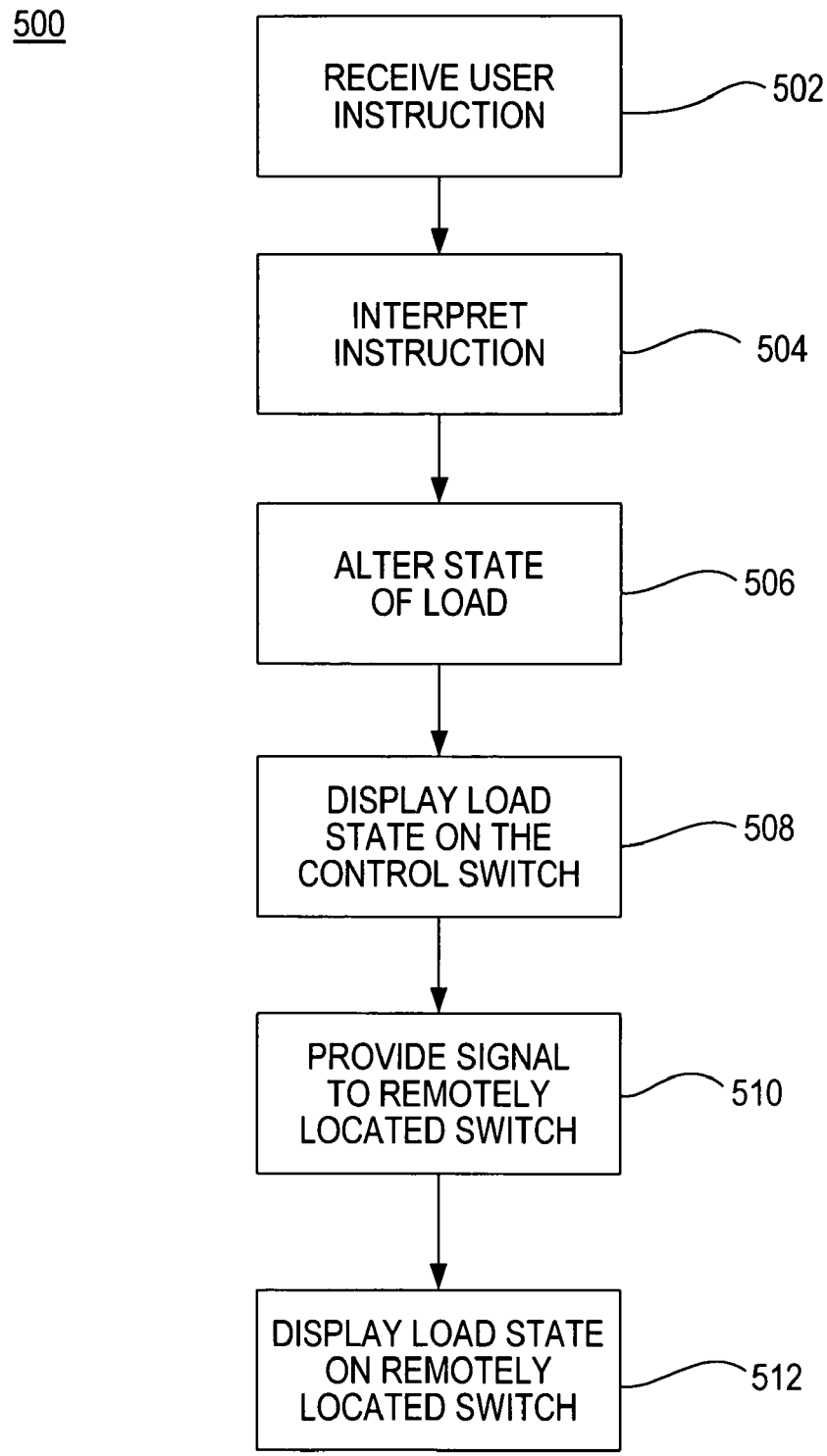
FIG. 5 is a flow diagram of the control switch operation in accordance with the present invention.

FIG. 5 illustrates a flow diagram 500 wherein a user can provide an instruction to the system of FIG. 4 to alter the state of the electrical device. The electrical device control system can receive a command from a user as shown in step 502. The command may be received by either the control switch or the remote control switch. When the instruction is received by the remote control switch, the instruction then is communicated to the control switch. In step 504, the control switch can interpret the instruction and, in response in step 506, alter the user-desired state of the electrical device. For example, if the electrical device is a lamp, the user-desired instruction could be to change the level of brightness of the lamp. As discussed above, the control switch can determine the state of the electrical device and display an indication of the state as shown in step 508. The control switch also can provide a status signal from the control switch to the remote control switch as shown in step 510. In response, the remote control switch also can display the state of the electrical device on the remotely controlled switch.

Figure 6:
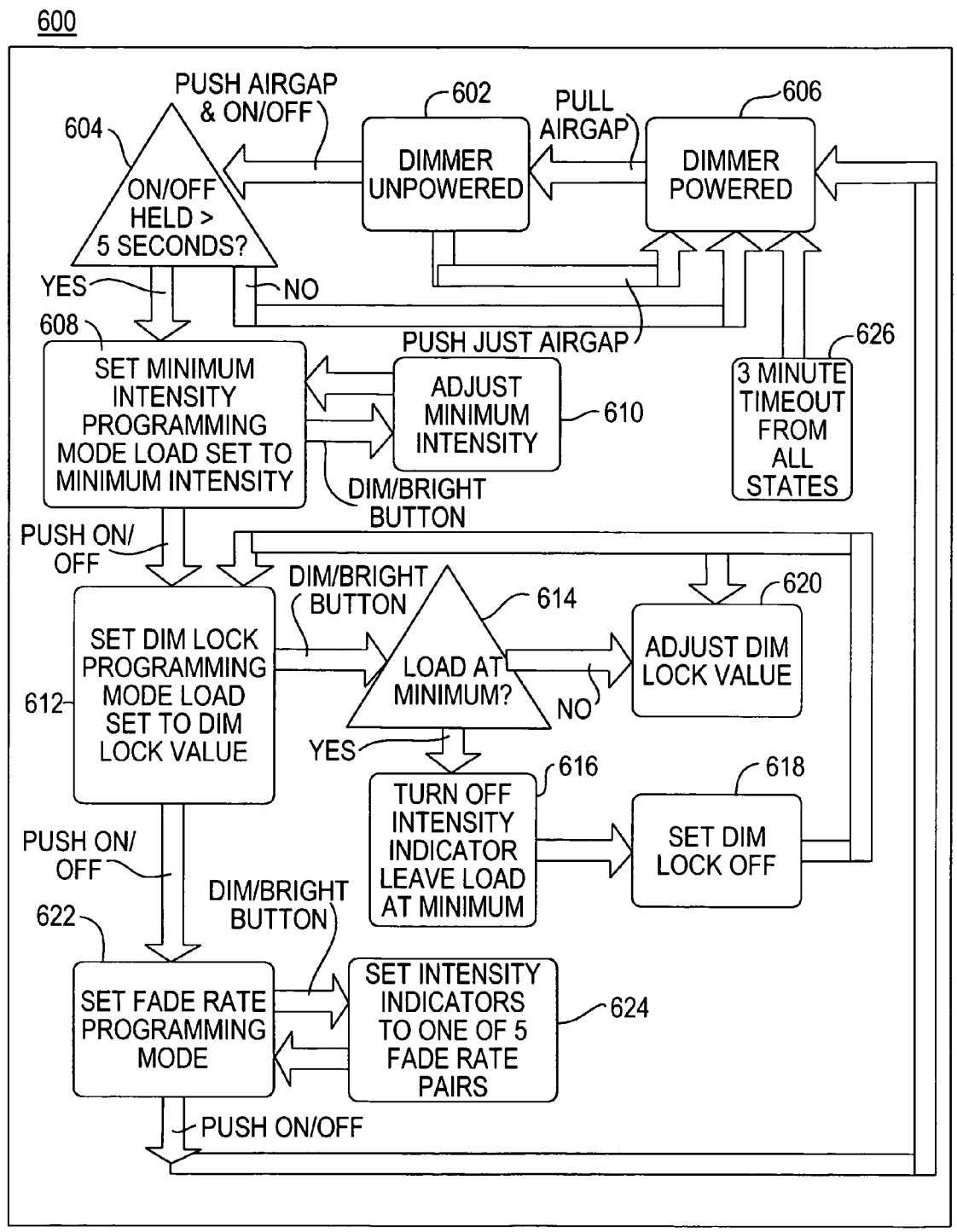
FIG. 6 is a flow diagram of an implementation of programming for the control switch in accordance with the present invention.

FIG. 6 is a flow chart 600 of a method of programming a dimmer 100 illustrated in FIG. 2 of the present invention. If the dimmer is in the OFF state 602, it is switched ON by pushing or closing the air gap switch in step 606. If the dimmer is ON as shown in step 606, it may be switched OFF 602 by pulling (i.e., opening) the air gap switch. Closing the air gap switch refers to the air gap switch 114 actuator as shown in FIG. 2 being closed so that power is available to the control unit 100. In the alternative, when the air gap switch 114 actuator is opened, all electric power to the control unit 100 is removed.

The programming mode may be entered while the dimmer is in the OFF position of step 602. A user may enter the programming mode by pushing the air gap switch actuator 114 and actuating the ON/OFF switch for a first period of time (for example, more than 5 seconds) as shown in step 604. If the ON/OFF switch is not held for the predetermined period of time, the dimmer will remain in a powered mode and will not enter into the programming mode as is shown in step 606. A status LED can be used to signify to the user that the dimmer has entered into the first programming mode, programming mode 1, wherein the status LED blinks once per second. FIG. 3 shows the LEDs, LD1-LD5, that are associated with the master display 124 of control switch 100. In particular, LED LD5 may be used to signify to the user that the dimmer has entered programming mode 1. In programming mode 1, a lower intensity level (referred to as "the minimum intensity level" of step 608) may be adjusted. As indicated by step 610, when the intensity switches, switch S3 and switch S2 in FIG. 2, are pushed, the minimum intensity level is adjusted 610 by actuating the intensity switches, S2 and S3. The new minimum intensity level will be stored within a given predetermined period of time such as, for example, one second after the activated intensity switch is released. One possible arrangement would include the illumination of one or more of the five LEDs to indicate the relative intensity level on the master display 124. Specifically, the LEDs (LD1-LD5) may be arranged vertically having LED LD1 at the bottom and LED LD5 at the top of the vertical row. Given this arrangement, LED LD1, when illuminated, represents the lowest intensity level attainable, while LED LD5 represents the highest attainable intensity level can be attained when switches S2 and S3 are used to adjust the relative intensity level. Once the light has reached the desired lower intensity level, the desired intensity level is stored after a predetermined period of time, such as a one second wait state where no input is received from the user. As shown in step 612, the user can then actuate the ON/OFF switch once to advance the dimmer into a second programming mode, programming mode 2, in which a dim lock value may be set. One possible embodiment may include the use of LED LD6 (FIG. 2) to blink twice per second for indicating that the dimmer has entered the second programming mode.

In the second programming mode 2, the user may set the preset intensity level (referred to as "Dim Lock programming" of step 612). The preset level is the default level for the dimmer. The preset level is the intensity level that the light will have when the light is turned ON by the dimmer. The user manipulates the dim/bright switches to set the default intensity. Again, as above, the preset level is stored some predetermined period of time after the intensity switch is released. As described above, the LEDs, LD1-LD5, may illuminate to indicate a relative intensity level. If the intensity is not set at a minimum in step 614, the dim-lock value is adjusted to the user selected intensity as shown in step 620. If the user does not want the preset level (i.e., user wants to switch off the dim-lock feature), the user can reduce the intensity to a lower intensity that is so low that the light is effectively turned OFF when set at that intensity as shown in steps 616 and 618. The preset level is then set to whatever level is selected by the use of the intensity switches while the light is ON or OFF. One possible embodiment of the control switch 100 in accordance with the present invention may prohibit the user from being able to override this preset level unless the user re-enters programming mode 2 and changes the preset level as explained above.

Once the preset level is programmed, the user may actuate the ON/OFF switch again to advance the dimmer to programming mode 3, in which the fade rate may be set as shown in step 622. As an indicator, the status LED blinks three times per second notifying the user that the dimmer programming has entered programming mode 3. The user has the option of setting the fade rate $f_i$ for an increase in intensity and the fade rate $f_d$ for a decrease in intensity. Note that the user may set a different fade rate for an increase in intensity as compared to a decrease in intensity. The combination of an increase fade rate $f_i$ and a decrease fade rate $f_d$ for a device is called a "fade rate pair." The user can manipulate the dim/bright intensity switches to cause one of the intensity status LEDs LD1-LD5 to switch ON. Each intensity status indicator may be associated with a fade rate pair. Table I shows an example of different fade rates that can be programmed during programming mode 3. For example, when LD3 is switched ON, a device such as a lamp will switch ON with a fade rate of 1.5 seconds from a full OFF state, and switch OFF with a fade rate of 3 seconds from a full ON state. The full ON state being when the lamp is switched ON at the highest intensity level possible programmed into the dimmer. The full OFF state being when the lamp is switched OFF so that no or substantially no current flows through the lamp. Once the fade rate programming is completed, the user may actuate the ON/OFF switch once again causing the dimmer to exit the programming mode and return to the dimmer powered on condition 606.

TABLE I

FADE RATES

| LED | FADE ON ($f_i$) | FADE OFF ($f_d$) |
|---|---|---|
| 1 | NO FADE | NO FADE |
| 2 | NO FADE | Approximately 3 s from full ON |
| 3 | Approximately 1.5 s from full OFF | Approximately 3 s from full ON |
| 4 | Approximately 1.5 s from full OFF | Approximately 10 s from full ON |
| 5 | Approximately 1.5 s from full OFF | Approximately 30 s from full ON |

The dimmer also may have a time-out feature a shown in step 626 to return the dimmer to the ON state of step 606 from any step of the programming after a specified period of inactivity. For example, the dimmer will return to the ON state if a user takes no action for a predetermined period of time (e.g., 3 minutes) while programming the dimmer.

Figure 7:
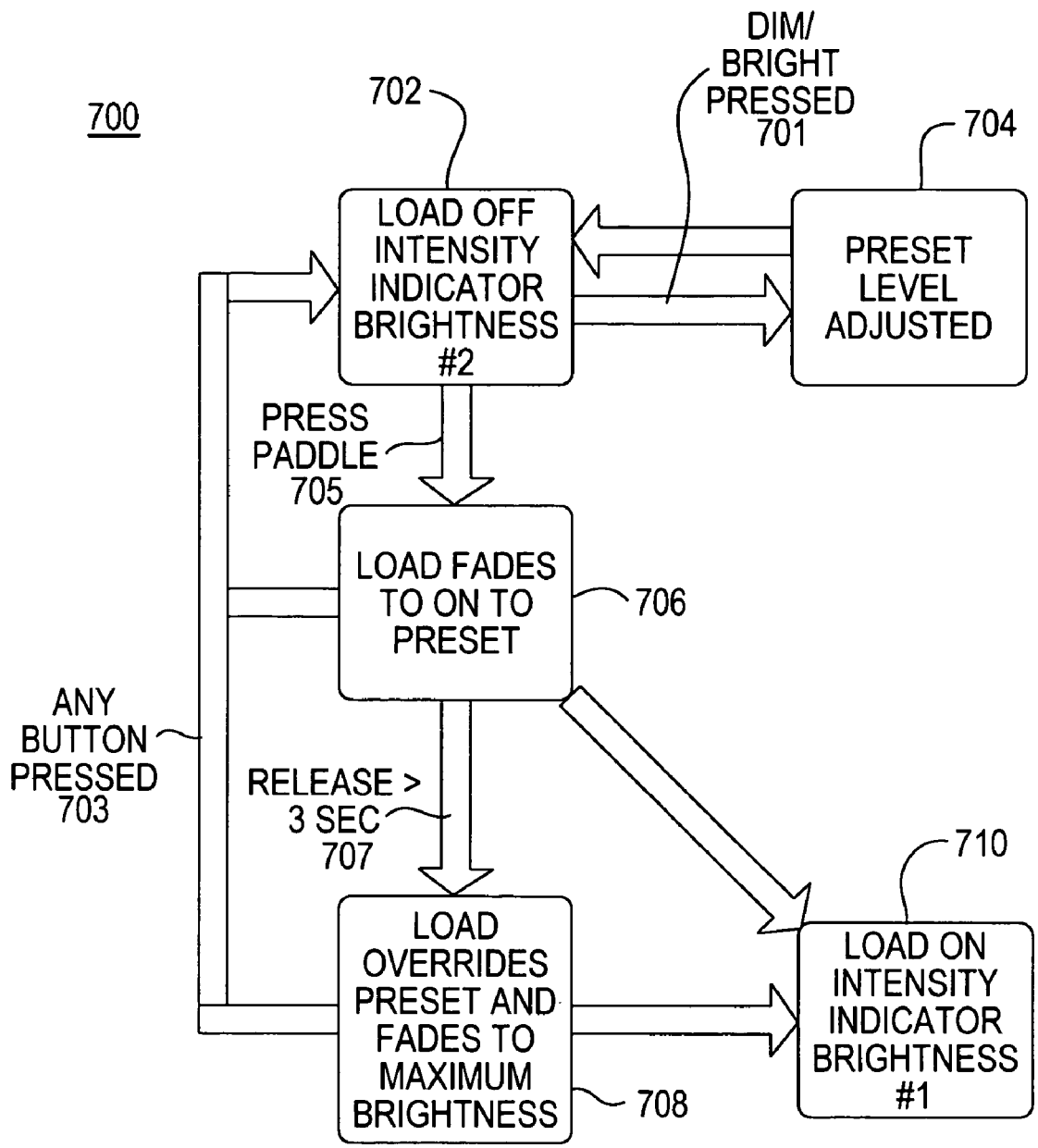
FIG. 7 is a flow diagram of an implementation of an operation of a control switch when the electrical device is OFF.

Referring to FIG. 7, flow chart 700 shows the operation of the dimmer when light 108 is off. In step 702, the light (or load) is OFF. The user may preset light intensity in step 704 by pressing the dim/bright switches S2 and S3 shown in FIG. 2. Even though the preset light intensity is set, the dimmer remains in the load OFF state where it is not providing power to light 108. A user may press the ON/OFF switch S1 in FIG. 2 to cause the light to fade to the preset ON intensity as indicated by step 706. If the user presses and holds the ON/OFF switch for a predetermined time period, such as 3 seconds or more, as shown in transition 707, the dimmer overrides the preset intensity and fades to a fixed level in step 708. The fixed level is different from the preset level and can be at maximum brightness. As shown by transition 703, pressing any button or switch S1, S2, or S3 during the fade to preset level or fade to fixed level will cause the light to return to the OFF state in step 702. In the alternative, the light will go to the ON state at the preset level in step 706. If after pressing the ON/OFF switch, the user releases the ON/OFF switch in less than the predefined time period (followed by at least a one second pause), the microprocessor interprets this action as a single switch closure, and the light also will fade to the ON state at the preset level as step 710 indicates.

Figure 8:
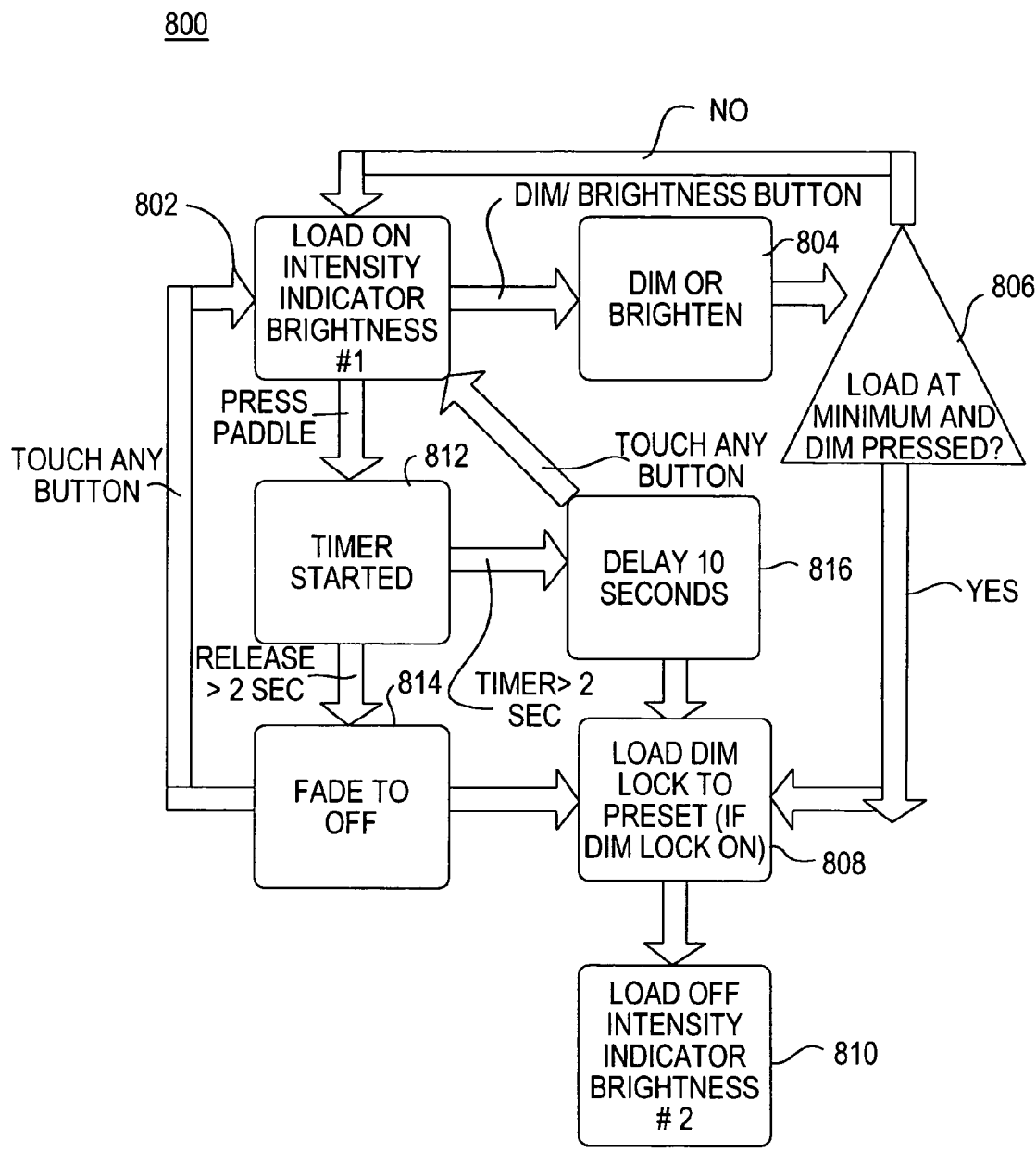

FIG. 8 presents a flow chart 800 for the operation of the dimmer when the dimmer is powered and the light is ON in step 802. A user may press the dim/bright switches to dim or brighten the light as indicated by step 804. The microprocessor determines in step 806 if the light is at the minimum intensity and whether the user has pressed the dim switch. If neither is affirmative, the light remains in the ON state as shown in step 802 at a lower intensity. In step 806, if the microprocessor determines that the light is at the minimum intensity, the dim switch is pressed, and the dim lock feature is activated, the dim lock is loaded in step 808 to the programmed preset value, which is further described below. Afterwards in step 810, whether or not the dim lock feature is activated, the light enters the OFF state.

When the light is in the ON state of step 802, the user may press the ON/OFF switch to activate a timer in step 812. If the ON/OFF button is released in less than a defined time period (e.g., 2 seconds), the light will fade to OFF as shown in step 814. Pressing any button during the fade interval will set the light back to the ON state of step 802. If the ON/OFF button is released greater than the predefined time period (e.g., 2 seconds), there will be a delay of a predetermined period of time (e.g., 10 seconds) as shown in step 816 prior to progression to step 808 where the dim lock is loaded to the programmed preset value.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for programming a control unit of a load, said control unit comprising an air gap switch, said air gap switch that selectively connects or disconnects power to a load, and a switch actuator, said method comprising:

entering a programming mode of the control unit while maintaining a control unit preset level stored in the control unit, said entering comprising:

disconnecting power to the load by opening the air gap switch;

closing the air gap switch; and simultaneous to closing the air gap switch engaging said switch actuator and maintaining the air gap switch in a closed state, both for a predetermined amount of time.

2. The method of claim 1 further comprising causing a status light to indicate the end of the predetermined amount of time.

3. The method of claim 2 wherein said indication is said status light blinking.

4. The method of claim 1 further comprising exiting programming mode if no action has been taken for a second predetermined amount of time.

5. The method of claim 1 wherein the switch actuator is used to selectively switch said load between an ON state and an OFF state.

6. The method of claim 1 wherein the switch actuator is operatively connected to a dimmer control switch.

7. The method of claim 1 further comprising entering a second programming mode by further engaging the switch actuator.

8. The method of claim 1 further comprising programming a preset intensity level of the load.

9. A method for programming a control unit of load, said control unit comprising an air gap switch that selectively connects or disconnects power to a load and a dimmer switch, said method comprising:

entering a programming mode of the control unit without changing a preset intensity level stored in the control unit, said entering comprising:

disconnecting power to the load by opening the air gap switch;

closing the air gap switch; and engaging the dimmer switch for a first period of time.

10. The method of claim 9 further comprising causing a status light to indicate the end of the first period of time.

11. The method of claim 9 wherein said status light blinking indicates that programming mode has been entered.

12. The method of claim 9 further comprising exiting the programming mode if no action has been taken for a predetermined amount of time.

13. The method of claim 9 further comprising closing the dimmer switch substantially simultaneously to maintaining the air gap switch in a closed position.

14. The method of claim 9 further comprising entering a second programming mode by further engaging the switch actuator.

15. The method of claim 9 further comprising programming a preset intensity level of the load.

16. A programmable controller comprising:

an air gap switch that controls whether electric power is available to the load;

a switch actuator; and a programmable control unit, the programmable control unit that is programmed to execute a programming mode, said programming mode that is entered when power is disconnected from the load by opening the air gap switch and then the air gap switch and the switch actuator are maintained in a closed position for a predetermined period of time, said programming mode that is entered without erasing information stored in the control unit.

17. The programmable controller of claim 16 further comprising a status light that indicates the end of the predetermined amount of time.

18. The programmable controller of claim 17 wherein said status light blinking indicates that programming mode has been entered.

19. The programmable controller of claim 16 said programming mode that terminates when no action has been taken for a second predetermined amount of time.

20. The programmable controller of claim 16 wherein the second switch selectively switches said load between an ON and an OFF state.

21. The programmable controller of claim 16 wherein the second switch is a dimmer switch.

22. The programmable controller of claim 16 said programming mode that executes a second programming mode that is entered by further engaging the second switch.

23. The programmable controller of claim 16 further comprising a programmable preset intensity level.

24. A programmable controller comprising:

an air gap switch that controls whether electric power is available to the load;

a dimmer switch; and a programmable control unit, said unit that is programmed to execute a programming mode, said programming mode that is entered without changing a preset control unit parameter stored in the control unit, said programming node that is entered when the following conditions occur: 1) power is disconnected from the load by opening the air gap switch, then 2) the air gap switch is maintained in a closed state and 3) substantially simultaneously with maintaining the air gap switch in a closed state, the dimmer switch is closed for a predetermined amount of time.

25. The programmable controller of claim 24 further comprising a status light that indicates the end of the predetermined amount of time.

26. The programmable controller of claim 25, wherein said status light blinking indicates that the programming mode has been entered.

27. The programmable controller of claim 24, wherein said programming mode terminates when no action has been taken for a predetermined amount of time.

28. The programmable controller of claim 24, wherein said programming mode comprises a second programming mode that is entered by further engaging the dimmer switch.

29. The programmable controller of claim 24 further comprising a programmable preset intensity level.

30. A system for controlling a load, the system comprising:

a control switch coupled to the load, the control switch comprising a transmitter and a receiver;

at least one remote control switch, the remote control switch comprising a transmitter and a receiver, the remote control switch for communicating via a single wire with the control switch using four or more sequences of half cycles of a 60 Hertz alternating current signal, the remote control switch transmitter that transmits the sequence of alternating current cycles, the control switch receiver that receives a selected one of the sequences of alternating current cycles and converts the sequence of alternating current cycles into a digital signal, the control switch transmitter which transmits status information via the single wire to the remote control switch receiver; and a microprocessor that receives and interprets the digital signal as a signal to control the operation of the load.

31. The system of claim 30, the control switch comprising a dimmer.

32. The system of claim 30, the control switch comprising one of an ON/OFF switch that selectively switches said load between an ON and an OFF state, a sensor switch, and a timer switch.

33. The system of claim 30, the sequence of alternating current cycles comprising M positive half waves and K negative half waves transmitted over L half cycle periods, where K and M are integers greater than or equal to zero, L is an integer greater than or equal to 1, and K+M is less than or equal to L.

34. The system of claim 30, further comprising a second remote control that communicates with the control switch using one of only three half wave sequences, said three half wave sequences comprising an alternating current full wave signal, a negative half wave signal, and a positive half wave signal.

35. The system of claim 30, the remote control switch comprising a remote control switch display.

36. The system of claim 35, the microprocessor that further causes the transmitter to transmit electrical load status information to a control switch display and the remote control switch display, said status information based, at least in part, on the digital signal.

37. A method for controlling a load using a control switch, the method comprising:

transmitting from a remote control switch to the control switch via a single wire a selected one of at least four sequences of half cycles of a power line frequency alternating current signal, said remote control switch that comprises a remote control switch display;

transmitting status information from the control switch to the remote control switch via the single wire;

receiving the status information at the remote control switch;

displaying the status information on the remote control switch display;

receiving the selected sequence of alternating current cycles and converting the sequence of alternating current cycles into a digital signal;

interpreting the digital signal; and using the interpreted digital signal to control the operation of the load based on the digital signal.

38. The method of claim 37 further comprising transmitting status information to the remote control, said status information being based on load status information.

39. The method of claim 37 further comprising transmitting load status information to a control switch display and the remote control switch display, said status information that is based, at least in part, on the digital signal.

40. The method of claim 37 further comprising displaying status information on the remote control.

41. The method of claim 37 further comprising receiving signals from a second remote control that communicates using only three half wave sequences, said three half wave sequences comprising at least one of an alternating current full wave signal, a negative half wave signal, and a positive half wave signal.

42. The method of claim 37, further comprising using alternating current cycles comprising M positive half waves and K negative half waves transmitted over L half cycle periods, where K and M are integers greater than or equal to zero, L is an integer greater than or equal to 1, and K+M is less than or equal to L.

43. A control system for controlling an electrical device comprising:

a control switch coupled to the electrical device to control the electrical device, said control switch further comprising a first display that displays whether the electrical device is ON or OFF and a second display, separate from the first display, said second display that displays the intensity level of the electrical device; and at least one remote control switch, having a remote display, the at least one remote control switch coupled via a wire to the control switch to control the electrical device through the control switch, the at least one remote control switch that receives status information from the control switch via the wire, said status information being transmitted as a selected one of at least four sequences of half cycles of a power line frequency alternating current signal, said status information to be displayed on the remote display, the remote display comprising a first display that displays whether the electrical device is ON or OFF and a second display, separate from the first display, that displays the intensity level of the electrical device.

44. The system of claim 43, said remote control switch that communicates with the control switch using four or more sequences of alternating current cycles, the sequence of alternating current cycles comprising M positive half waves and K negative half waves transmitted over L half cycle periods, where K and M are integers greater than or equal to zero, L is an integer greater than or equal to 1, and K+M is less than or equal to L.

45. The switching control system of claim 43, wherein the control switch and the at least one remote control switch are adapted to receive a plurality of user-command control signals to control the status of the electrical device.

46. The programmable controller of claim 24, wherein said preset control unit parameter comprises one of a default intensity level and a fade rate.

* * * * *